April 11, 1944.     A. F. SANDERS     2,346,458
INTERNAL COMBUSTION ENGINE COMBINED WITH A COMPRESSOR
Filed April 16, 1941     2 Sheets-Sheet 2
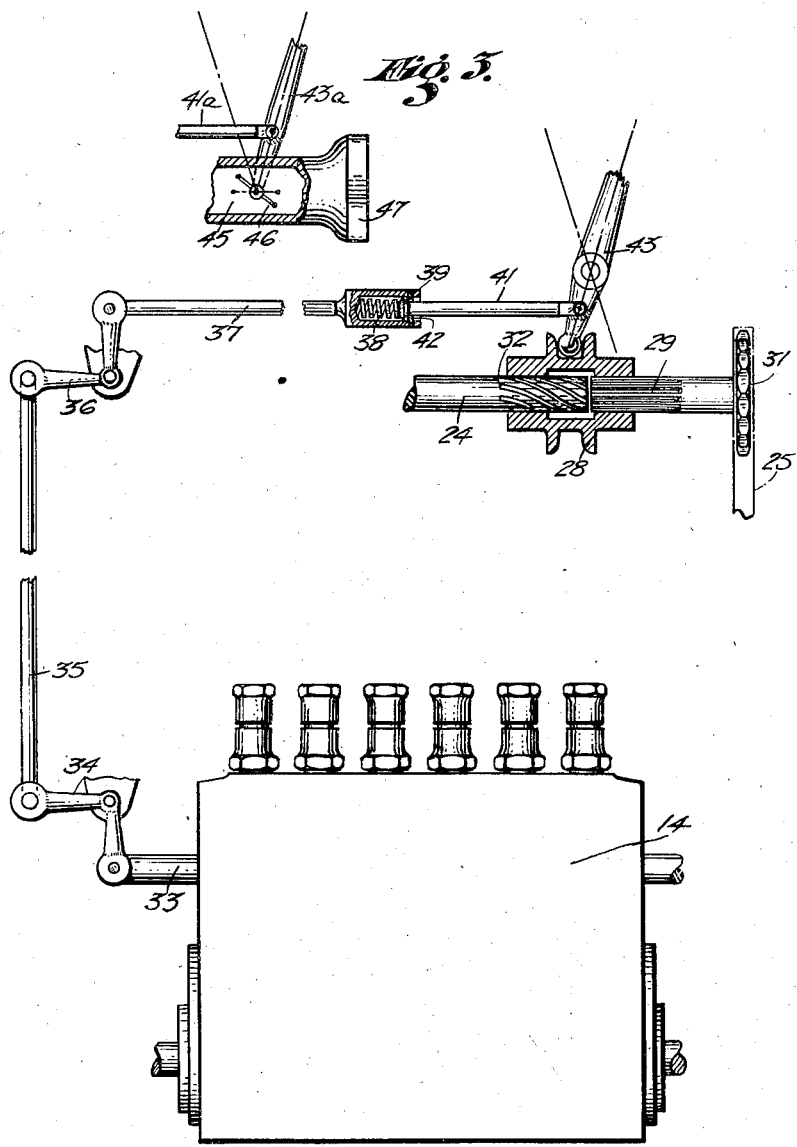
Inventor
Arthur F. Sanders
by Mawhinney & Mawhinney
Attorneys.

Patented Apr. 11, 1944

2,346,458

UNITED STATES PATENT OFFICE 2,346,458

INTERNAL COMBUSTION ENGINE COMBINED WITH A COMPRESSOR

Arthur Freeman Sanders, Leeds, England, assignor of one-half to John Fowler & Co. (Leeds) Limited, Leeds, England Application April 16, 1941, Serial No. 388,883
In Great Britain February 8, 1940

9 Claims. (Cl. 123—72)

This invention relates to four-stroke, fuel-injection, compression-ignition engines.

At the present time, when these are supplied with pre-compressed charges of air, a common practice is for the maximum pre-compression pressure obtainable at any engine speed to increase as the engine speed increases, and vice versa, and there are difficulties in obtaining pre-compressed charges of air at lower pressures than the maximum over the full range of speed at which the engine is to run.

Our main object is to provide an improved arrangement of charging the engine.

For an understanding of the invention and of the advantages thereof reference should be directed to the following description, in which reference is made to the accompanying sheets of drawings, wherein:

Figure 2 is a diagram showing one method of adjusting the valve timing of the compressor and, at the same time, the fuel supply control means; and Figure 3 is a part-sectional view of an inlet manifold with which the compressor may be fitted.

Figure 1:
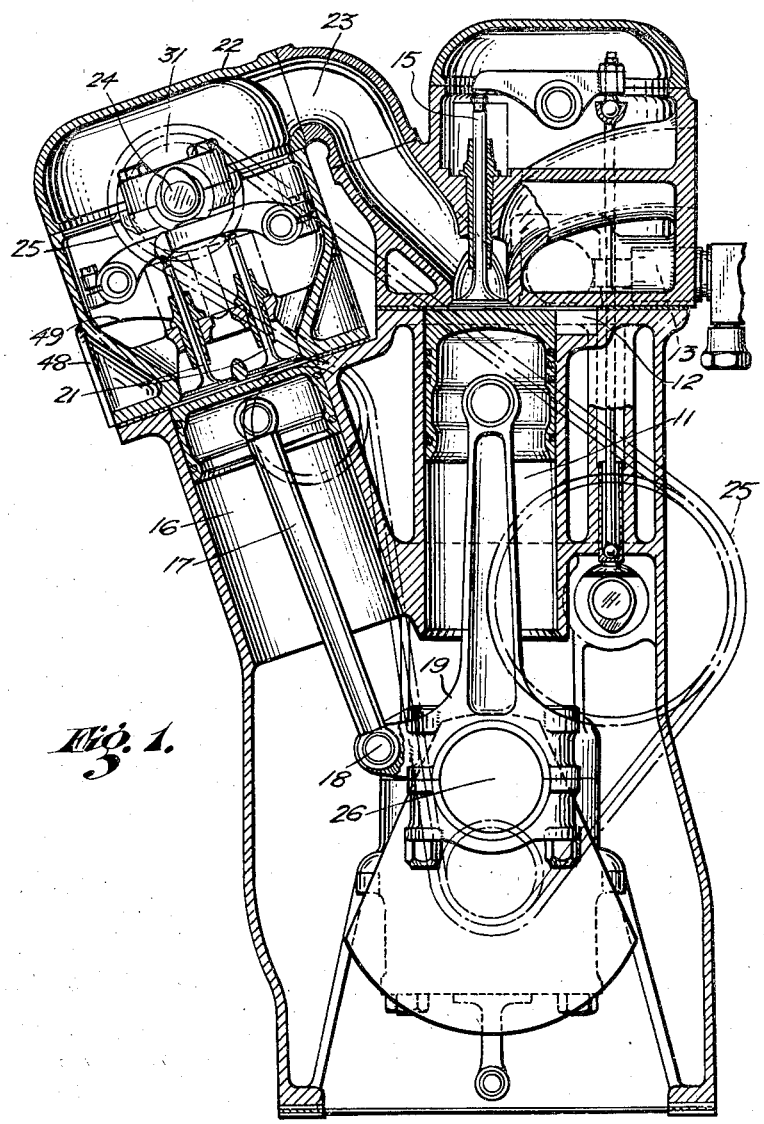
Figure 1 is a sectional elevation of an engine and associated compressor arranged according to the invention.

The invention broadly consists in an engine, as specified in the first paragraph hereof, having mechanically-operated inlet and exhaust valves and connected to drive, at a speed responsive to that of the engine, a reciprocating compressor also having mechanically-operated inlet and exhaust valves, the valve gears of the engine and compressor giving like relative volumetric efficiencies at substantially all speeds at which the engine is to run, the compressor discharging into a common delivery chamber which is arranged to be contiguous to the engine inlet valves, and the compressor supplying the engine during the "suction" stroke thereof with charges of air at a pre-determined maximum pressure which remains substantially constant at the existing atmospheric pressure at all speeds at which the engine is to run. (So far as I am aware, a reciprocating compressor is the only type of compressor which is capable of giving a substantially even boost pressure over the effective range of speed, and, in addition, of providing, in a simple manner, for heavy boosts up to four or five atmospheres.)

In obtaining relative volumetric efficiencies of compressor and power cylinders in the system under consideration reference must be made to the effects of the boosted pressure in the compressor cylinder clearance spaces, and in the power cylinder compression space. Figures of merit of sufficient accuracy are obtained as follows:

*Power cylinder of boosted engine*

At the beginning of induction the piston is nearly at top centre, and the compression space is filled with exhaust gas at atmospheric pressure. Hence, taking the charging of the power cylinder in stages, the compression space is first filled up with boosted charge to the boosted pressure. The piston is then moved to out-centre and returns to the point at which the inlet valve closes. Ignoring heat, surging and strangulation effects, the admitted volume of charge is equal to $$A\left(\frac{Sti+NS}{(R-1)(N+1)}\right)$$

Where
R=compression ratio
N=boost gauge pressure/atmospheric pressure
A=cylinder cross-section
S=full stroke
Sti=stroke from top-centre to close of inlet valve.

The conventional volumetric efficiency becomes:

$$\frac{Sti+NS/(R-1)(N+1)}{S}$$

*Compressor cylinder*

At the close of the transfer valve there is trapped in the clearance space an amount of air compressed to boost pressure (presuming a suitable transfer valve closing time). So that air is rejected, or the piston must travel some distance down the stroke before air is admitted. This idle travel of the piston can readily be estimated from the boost pressure and the piston position on closing the transfer valve. The new charge space is between this position of the piston and its position on the closing of the inlet valve, this distance forming the effective stroke Se.

Hence the admitted volume of air is equal to ASe.

The conventional volumetric efficiency becomes:

$$\frac{Se}{S}$$

Where Se=effective fraction of stroke.

These figures of merit of the volumetric deliveries are necessary in order to predict the resultant boost ratio.

It is important that the valve porting and timing is such that speed effects are similar in compressor and power cylinder, and that volumetric efficiency of each remains as constant as possible, as will be apparent to those skilled in the art.

Preferably the compressor and engine share a common crankshaft, the cylinders of the two being in close-V formation.

The drawings show one cylinder 11 of a compression-ignition, fuel-injection engine adapted to operate on the four-stroke cycle. The combustion space is indicated at 12, the fuel injector 13 being supplied from the pump 14 (Figure 2) in normal manner. 15 is the inlet valve for this cylinder.

Only one of the compressor cylinders 16 is shown, the connecting-rod 17 of the associated piston being connected at 18 to the big end of the connecting rod 19 for the engine piston. The compressor and engine thus share a common crankshaft, the cylinders of the two being in close-V formation. The compressor cylinder is fitted with a pair of exhaust or transfer valves 21 which are operable in unison, and the compressor inlet valve does not appear in the illustration.

The compressor cylinders deliver the compressed air into a common delivery chamber provided by the casing 22 above the cylinders and arranged to be contiguous to the inlet valves of the engine. From this chamber are short ducts 23 leading, respectively, to the inlet valves of the different engine cylinders. The active swept volume of the compressor cylinders bears such a ratio to the active swept volume of the engine cylinders, taking into account the clearance volume of the compressor cylinders, as to give the desired maximum pre-compression charge pressure when the valve gear of the compressor is set for normal operation. The compressor essentially runs at engine speed, the cycle of its valve operation being completed in two strokes. It will be observed that the compressor valve gear is enclosed by the casing 22 which provides a relatively-large chamber (i. e., the space round the valve gear) to receive the compressed air delivered by the compressor.

The invention further includes means whereby pre-compressed charges of air can be supplied to the engine at lower pressures than the maximum over the said range of speeds. Thus the pre-compressed charges may be supplied by a compressor having means for controlling the inlet thereof—for example, a throttle valve. Alternatively, the compressor may have a valve gear which can be adjusted to enable the compressor to supply pre-compressed charges at lower pressures than the maximum. (Obviously, one must ensure sufficient heat in the charge, at pre-compression pressures below the maximum, to provide ignition and satisfactory combustion of the charge.)

In the present instance the valves of the compressor are operated by a separate shaft 24, driven by a chain 25 from the engine crankshaft 26, such that the timing may be advanced or retarded as required independently of the valve timing of the engine, or the inlet and transfer valves of the compressor cylinders could be operated by separate means, whereby the timing of the two valves may be varied separately, or one valve timing left fixed. For example, as shown by Figure 2, use may be made of a muff coupling between the engine drive and the valve gear of the compressor, the muff 28 being adapted in a known manner to slide upon longitudinal splines 29 on one part (the shaft of the chain wheel 31 in this case) and to have a screw-threaded or like engagement 32 with the other part, the camshaft 24. By suitable setting of the timing of the valve gear the volumetric efficiency of the compressor cylinders may be varied at will with corresponding changes in the pre-compression pressures of the charge.

At pre-compression pressures other than the maximum the thermo-dynamic inefficiency of the compressor will automatically heat the charge to an extent sufficient to provide ignition and satisfactory combustion of the charge when injection takes place. In this connection note should be taken of the propinquity of the delivery chamber to the transfer valves, and to the inlet valves of the engine cylinders, resulting in minimum loss of heat or lowering of the temperature; also in the minimisation of surges.

Alternatively, however, the inlet pipe to the compressor may be provided with a throttle valve in known manner the movement of which will give the required variation in the pre-compression pressures. The heating of the charge due to throttling will serve for ensuring ignition and satisfactory combustion.

Figure 3 shows an inlet manifold 45 fitted with a throttle valve 46 and having a flange 47 adapted to be bolted down upon the flange 48 on the compressor casing 22. 49 represents the upper wall of an inlet passage, for the compressor, adapted to communicate with the inlet manifold.

The invention further includes means for co-relating the quantity of fuel injected per cycle to the pre-compression pressure over some at least of the speed range. Thus, the fuel supply control means may be coupled to the compressor valve timing control means, or to the said throttle valve, as the case may be, so that the fuel supply will increase or decrease with the variation in the pre-compression density. Preferably, however, the compressor valve gear, or the said throttle valve, is so arranged that the pre-compression pressure will not fall below a predetermined value, the fuel supply control means being resiliently connected to the control of the compressor valve gear, or the said throttle valve, so that for power demands below the said predetermined value the fuel supply will be varied independently of the pre-compression pressure of the charge.

Figure 2 shows the fuel control rod 33 connected through a bellcrank 34 to a link 35 which is in turn connected to a bellcrank 36. The latter is linked to a rod 37 terminating with a spring chamber 38 in which can slide a plunger 39 on a rod 41. A circlip 42 prevents the withdrawal of the plunger from the spring chamber. The rod 41 is pivoted to the control lever 43 by which the muff 28 can be slid axially. Any suitable form of thrust bearing (not shown) can be interposed between the lever 43 and the muff.

In the alternative of Figure 3, the lever 43a, for actuating the throttle valve 46, is linked to the rod 41a, and this rod is assumed to be connected to the fuel control rod 33 in the manner in which the rod 41 of Figure 2 is.

What I claim as my invention and desire to secure by Letters Patent of the United States is:

1. In combination, a fuel-injection, compression-ignition, four-stroke engine, a reciprocating compressor, and means whereby the compressor will be driven at a speed responsive to that of the engine, the active swept volume of the compressor cylinders bearing such a ratio to the active swept volume of the engine cylinders, taking into account the clearance volume of the compressor cylinders, as to supply to the engine charges of air at a predetermined maximum pressure which remains substantially constant over the whole range of speeds at which the engine is to run said means including valve gear and means for adjusting said valve gear.

2. In combination, a fuel-injection, compression-ignition, four-stroke engine, a reciprocating compressor, a common delivery chamber into which the compressor cylinders discharge, said chamber arranged to be contiguous to the inlet valves of the engine, and means whereby the compressor will be driven at a speed responsive to that of the engine, the active swept volume of the compressor cylinders bearing such a ratio to the active swept volume of the engine cylinders, taking into account the clearance volume of the compressor cylinders, as to supply to the engine charges of air at a predetermined maximum pressure which remains substantially constant over the whole range of speeds at which the engine is to run said means including valve gear and means for adjusting said valve gear.

3. In combination, a fuel-injection, compression-ignition, four-stroke engine, a reciprocating compressor, the engine and compressor being arranged to share a common crankshaft and having their cylinders in close-V formation, and the active swept volume of the compressor cylinders bearing such a ratio to the active swept volume of the engine cylinders, taking into account the clearance volume of the compressor cylinders, as to supply to the engine charges of air at a predetermined maximum pressure which remains substantially constant over the whole range of speeds at which the engine is to run said compressor including valve gear and means for adjusting said valve gear.

4. In combination, a fuel-injection, compression-ignition, four-stroke engine, a reciprocating compressor, means whereby the compressor will be driven at a speed responsive to that of the engine, the active swept volume of the compressor cylinders bearing such a ratio to the active swept volume of the engine cylinders, taking into account the clearance volume of the compressor cylinders, as to supply to the engine charges of air at a predetermined maximum pressure which remains substantially constant over the whole range of speeds at which the engine is to run, and means whereby pre-compressed charges of air can be supplied to the engine at lower pressures than the maximum over the said range of speeds said latter means including valve gear and means for adjusting said valve gear.

5. In combination, a fuel-injection, compression-ignition, four-stroke engine, a reciprocating compressor, means whereby the compressor will be driven at a speed responsive to that of the engine, the active swept volume of the compressor cylinders bearing such a ratio to the active swept volume of the engine cylinders, taking into account the clearance volume of the compressor cylinders, as to supply to the engine charges of air at a predetermined maximum pressure which remains substantially constant over the whole range of speeds at which the engine is to run, means whereby pre-compressed charges of air can be supplied to the engine at lower pressures than the maximum over the said range of speeds, and means for co-relating the quantity of fuel injected per cycle to the pre-compression pressure over some at least of the speed range said latter means including valve gear and means for adjusting said valve gear.

6. In combination, a fuel-injection, compression-ignition, four-stroke engine, a reciprocating compressor having an overhead valve gear and arranged with its cylinders in close-V formation with those of the engine, the engine and compressor being arranged to share a common crankshaft, a delivery chamber into which the compressor cylinders discharge, said chamber formed by a casing enclosing the valve gear of the compressor, and the engine having short inlet ducts connected to said chamber and means for adjusting said valve gear.

7. In combination, a fuel-injection, compression-ignition, four-stroke engine, a reciprocating compressor, and means whereby the compressor will be driven at a speed responsive to that of the engine, the active swept volume of the compressor cylinders bearing such a ratio to the active swept volume of the engine cylinders, taking into account the clearance volume of the compressor cylinders, as to supply to the engine charges of air at a predetermined maximum pressure which remains substantially constant over the whole range of speeds at which the engine is to run, and the compressor having a valve gear which can be adjusted to enable the compressor to supply pre-compressed charges of air at lower pressures than the maximum.

8. In combination, a fuel-injection, compression-ignition, four-stroke engine, a reciprocating compressor having an overhead valve gear and arranged with its cylinders in close-V formation with those of the engine, the engine and compressor being arranged to share a common crankshaft, a delivery chamber into which the compressor cylinders discharge, said chamber formed by a casing enclosing the valve gear of the compressor, and the engine having short inlet ducts connected to said chamber, and means for varying the timing of the valve gear of the compressor with reference to the timing of the engine.

9. In combination, a fuel-injection, compression-ignition, four-stroke engine, a reciprocating compressor having an overhead valve gear and arranged with its cylinders in close-V formation with those of the engine, the engine and compressor being arranged to share a common crankshaft, a delivery chamber into which the compressor cylinders discharge, said chamber formed by a casing enclosing the valve gear of the compressor, and the engine having short inlet ducts connected to said chamber, means for varying the timing of the valve gear of the compressor with reference to the timing of the engine, and means connected to said last-mentioned means for co-relating the quantity of fuel injected per cycle to the pre-compression pressure over some at least of the speed range of the engine.

ARTHUR FREEMAN SANDERS.